US006748738B2

(12) United States Patent
Smith

(10) Patent No.: US 6,748,738 B2
(45) Date of Patent: Jun. 15, 2004

(54) HYDRAULIC REGENERATION SYSTEM

(75) Inventor: David P. Smith, Joliet, IL (US)

(73) Assignees: Caterpillar Inc., Peoria, IL (US); Shin Caterpillar Mitsubishi Ltd (JP)

( * ) Notice: Subject to any disclaimer, the term of this patent is extended or adjusted under 35 U.S.C. 154(b) by 30 days.

(21) Appl. No.: 10/146,899

(22) Filed: May 17, 2002

(65) Prior Publication Data

US 2003/0213238 A1 Nov. 20, 2003

(51) Int. Cl.[7] .......... F16D 31/02
(52) U.S. Cl. .......... 60/414; 60/464; 91/454
(58) Field of Search .......... 60/464, 484, 414; 91/444, 446, 454, 455, 456, 457, 508, 523

(56) References Cited

U.S. PATENT DOCUMENTS 5,819,536 A * 10/1998 Mentink .......... 60/464
6,467,264 B1 * 10/2002 Stephenson et al. .......... 60/460
6,502,393 B1 * 1/2003 Stephenson et al. .......... 60/414

FOREIGN PATENT DOCUMENTS

WO WO 00/00748 1/2000

* cited by examiner

*Primary Examiner*—Thomas E. Lazo
(74) *Attorney, Agent, or Firm*—Finnegan, Henderson, Farabow, Garrett & Dunner; J. W. Burrows; Steve M. Hanley

(57) ABSTRACT

A hydraulic regeneration system for a work machine is provided. The hydraulic regeneration system includes a first hydraulic actuator having a first chamber and a second chamber, a second hydraulic actuator having a third chamber and a fourth chamber, and a source of pressurized fluid. A first directional control valve is disposed between the source of pressurized fluid and the first chamber of the first hydraulic actuator and the third chamber of the second hydraulic actuator. A second directional control valve is disposed between the source of pressurized fluid and the second chamber of the first hydraulic actuator and the fourth chamber of the second hydraulic actuator. An accumulator may also be used to store pressurized fluid and selectively supply pressurized fluid to increase the efficiency of the work machine.

39 Claims, 5 Drawing Sheets

HYDRAULIC REGENERATION SYSTEM

TECHNICAL FIELD

The present invention is directed to hydraulic regeneration. More particularly, the present invention is directed to a system and method for accumulating and using regenerated hydraulic energy.

BACKGROUND

Work machines are commonly used to move heavy loads, such as earth, construction material, and/or debris. These work machines, which may be, for example, wheel loaders, excavators, bulldozers, backhoes, and track loaders, typically include at least two types of power systems, a propulsion system and a work implement system. The propulsion system may be used, for example, to move the work machine around or between work sites and the work implement system may be used, for example, to move a work implement through a work cycle at a job site.

The efficiency of a work machine may be measured by comparing the amount of energy input into the work machine with the amount of work performed by the work machine. Typically, a work machine will include an engine that powers both the propulsion system and the work implement system. Thus, the energy input to the work machine may be measured as a function of the amount of fuel supplied to the engine. The work output of the work machine may be measured as a function of the work performed by the propulsion system and the work implement system. A work machine with a high efficiency will perform a greater amount of work on a given quantity of fuel.

A work implement system for a work machine may include a hydraulic system that is powered by pressurized fluid. In this type of system, a source of pressurized fluid converts energy generated by the combustion of fuel in the engine into pressurized fluid. This pressurized fluid may then be directed to a hydraulic actuator, which may be, for example, a hydraulic cylinder or a fluid motor, to move the work implement. Because the pressurized fluid represents energy, the efficiency of the work machine is reduced when pressurized fluid is released to a tank. The reduction in efficiency results from the release of energy as heat to the tank as the pressure of the fluid drops. In other words, the release of pressurized fluid to the tank results in energy being used to add heat to the fluid in the tank instead of being used to move the work implement.

An exemplary hydraulic system for a work machine that recovers or recycles fluid from a lifting cylinder is described in International Publication No. WO 00/00748 to Laars Bruun. As described therein however, an additional pump operated by the drive unit of the work machine is required to communicate fluid between an accumulator and the head end of the lifting cylinder. Depending upon the desired direction of movement of the lift cylinder, and the pressure difference between accumulator and cylinder, the drive unit supplies energy to, or receives energy from, the hydraulic circuit. Thus, an additional energy input is required to recycle the captured energy and the efficiency gains are, therefore, minimized.

Energy may also be wasted by the propulsion system of a work machine. For example, a significant amount of energy generated by the engine may be converted to kinetic energy of the work machine through a transmission on the work machine. This kinetic energy is typically dissipated as heat through the brakes when the ground speed of the work machine is reduced.

Thus, the efficiency of a work machine may be improved by limiting the amount of energy that is inefficiently used or wasted during the ordinary operation of the work machine. In addition, the efficiency of the work machine may be improved by capturing energy in a device such as an accumulator that would otherwise be wasted. The captured energy may then be used in a future operation of the work machine, thereby reducing the fuel demands of the engine.

The hydraulic regeneration system of the present invention solves one or more of the problems set forth above.

SUMMARY OF THE INVENTION

One aspect of the present invention is directed to a hydraulic system that includes a first hydraulic actuator having a first chamber and a second chamber, a second hydraulic actuator having a third chamber and a fourth chamber, and a source of pressurized fluid. A first directional control valve is disposed between the source of pressurized fluid and the first chamber of the first hydraulic actuator and the third chamber of the second hydraulic actuator. A second directional control valve is disposed between the source of pressurized fluid and the second chamber of the first hydraulic actuator and the fourth chamber of the second hydraulic actuator.

In another aspect, the present invention is directed to a hydraulic system that includes an accumulator, a source of pressurized fluid, a first directional control valve, and a second directional control valve. A first fluid line connects the source of pressurized fluid with the first directional control valve and a second fluid line connects the source of pressurized fluid with the second directional control valve. A third directional control valve is configured to control the rate and direction of fluid flow between the accumulator and the first and second fluid lines.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
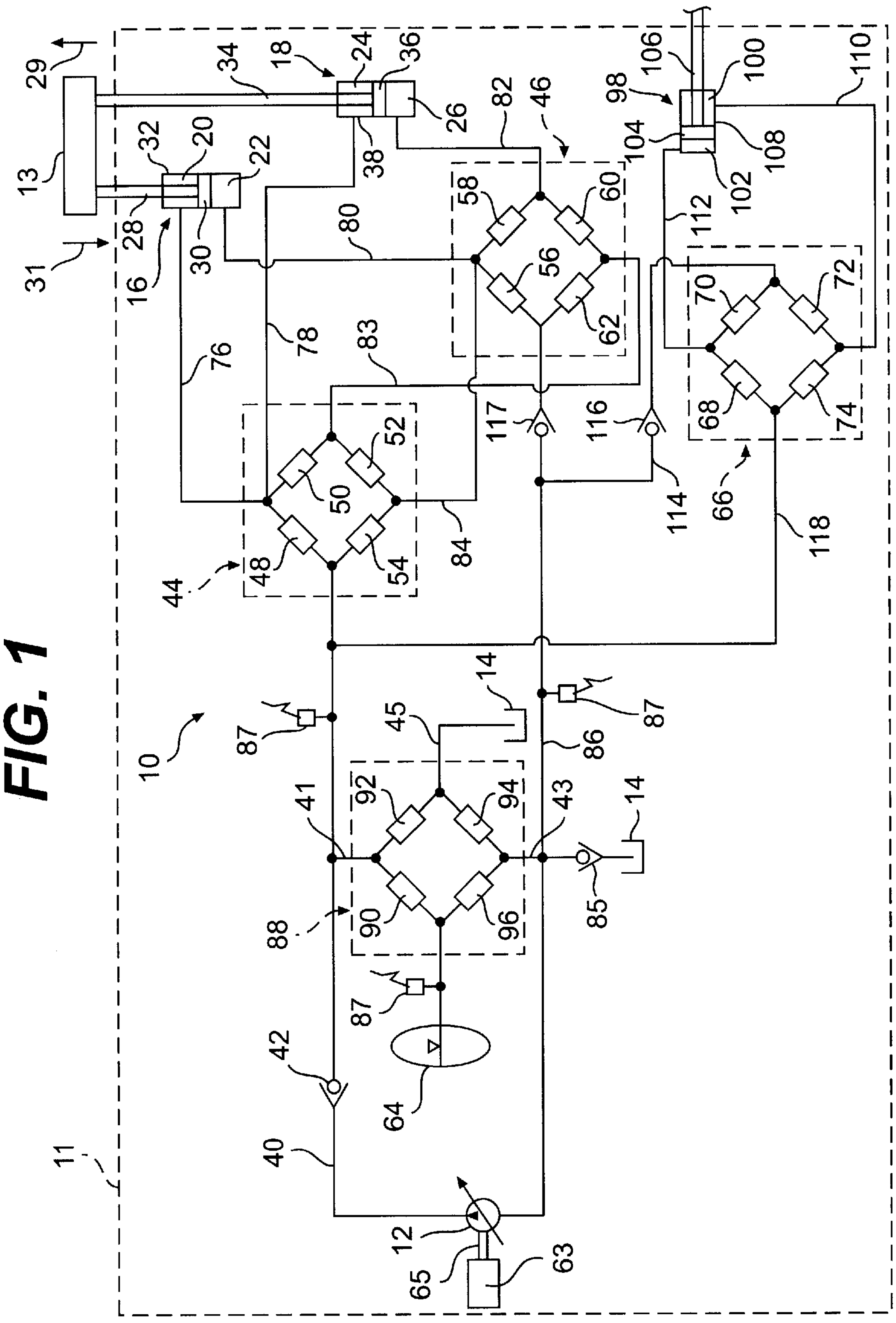
FIG. 1 is a schematic and diagrammatic illustration of an exemplary embodiment of a hydraulic system according to the present invention.

As diagrammatically illustrated in FIG. 1, a hydraulic system 10 for a work machine 11 is provided. Work machine

11 may be any type of machine commonly used to move loads, such as, for example, earth, construction material, or debris. Work machine 10 may be, for example, a wheel loader, a track loader, a backhoe, an excavator, or a bulldozer. Work machine 11 includes a work implement 13. Work implement 13 may include a ground engaging tool, such as, for example, a bucket or blade, and a linkage assembly upon which the ground engaging tool is mounted.

A first hydraulic actuator 16 and a second hydraulic actuator 18 are operatively connected with work implement 13. First and second hydraulic actuators 16 and 18 may be, for example, hydraulic cylinders or fluid motors. In the exemplary embodiment illustrated in FIG. 1, first and second hydraulic actuators 16 and 18 are hydraulic cylinders.

First and second hydraulic actuators 16 and 18 may be connected to the ground engaging tool of the work implement or the linkage assembly of the work implement. In one exemplary embodiment, first and second hydraulic actuators 16 and 18 are connected to the linkage assembly of the work implement and are configured to provide lifting power for the work implement. As one skilled in the art will recognize, first and second hydraulic actuators may perform alternative functions on work machine 11.

As shown in FIG. 1, first hydraulic actuator 16 includes a housing 32 that slidably receives a piston 30 and a rod 28. Piston 30 defines a first chamber 20 and a second chamber 22 within housing 32 of first hydraulic actuator 16. First chamber 20 may also be referred to as the rod end of first hydraulic actuator 16, and second chamber 22 may also be referred to as the head end of first hydraulic cylinder 16.

Similarly, second hydraulic actuator 18 includes a housing 38 that slidably receives a piston 36 and a rod 34. Piston 36 defines a third chamber 24 and a fourth chamber 26 within housing 38 of second hydraulic actuator 18. Third chamber 24 may also be referred to as the rod end of second hydraulic actuator 18, and fourth chamber 26 may also be referred to as the head end of second hydraulic cylinder 18.

As also shown in FIG. 1, hydraulic system 10 includes a source of pressurized fluid 12, which may be, for example, a fixed capacity or variable capacity pump. Source of pressurized fluid 12 draws fluid from a tank 14 and works the fluid to a predetermined pressure. A check valve 85 may be disposed between tank 14 and source of pressurized fluid 12 to prevent an undesirable flow of fluid from source of pressurized fluid 12 to tank 14.

Source of pressurized fluid 12 directs the pressurized fluid through a fluid line 40 to a first directional control valve 44. A check valve 42 may be positioned in fluid line 40 to prevent an undesirable flow of fluid from first directional control valve 44 to source of pressurized fluid 12. First directional control valve 44 is connected to first chamber 20 of first hydraulic actuator 16 through a fluid line 76. First directional control valve 44 is also connected to third chamber 24 of second hydraulic actuator 18 through a fluid line 78.

First directional control valve 44 includes a first metering valve 48, a second metering valve 50, a third metering valve 52, and a fourth metering valve 54. Each of the first 48, second 50, third 52, and fourth 54 metering valves are independently adjustable to meter a flow of fluid therethrough. For example, first metering valve 48 may be opened to allow a variable flow rate of fluid to flow from fluid line 40 to fluid lines 76 and 78 and into first chamber 20 and third chamber 24, respectively. Alternatively, first directional control valve 44 may be comprised of any type of valve readily apparent to one skilled in the art, such as, for example, a spool valve.

As also illustrated in FIG. 1, first directional control valve 44 is connected to a second directional control valve 46 through fluid lines 83 and 84. Second directional control valve 46 also includes a first metering valve 56, a second metering valve 58, a third metering valve 60, and a fourth metering valve 62. Each of the first 56, second 58, third 60, and fourth 62 metering valves are independently controllable to meter a flow of fluid therethrough.

Second directional control valve 46 is connected to second chamber 22 of first hydraulic actuator 16 through a fluid line 80 and to fourth chamber 26 of second hydraulic actuator 18 through a fluid line 82. Second directional control valve 46 is also connected to the inlet of source of pressurized fluid 12 and tank 14 through a fluid line 86. Alternatively, second directional control valve 46 may be comprised of any type of valve readily apparent to one skilled in the art, such as, for example, a spool valve.

As illustrated in FIG. 1, work machine 11 may include a third hydraulic actuator 98. Third hydraulic actuator 98 may be connected to work implement 13 or may be connected to a second work implement (not shown) on work machine 11. Third hydraulic actuator 98 may control a secondary function, such as tilt, for work implement 13.

Third hydraulic actuator 98 includes a housing 108 that slidably receives a piston 104 and a rod 106. Piston 104 defines a fifth chamber 100 and a sixth chamber 102 within housing 108. Fifth chamber 100 may also be referred to as the rod end of third hydraulic actuator 98, and sixth chamber 102 may also be referred to as the head end of third hydraulic cylinder 98.

As further shown in FIG. 1, a third directional control valve 66 controls the rate and direction of fluid flow to and from third hydraulic actuator 98. Third directional control valve 66 includes a first metering valve 68, a second metering valve 70, a third metering valve 72, and a fourth metering valve 74. Each of the first 68, second 70, third 72, and fourth 74 metering valves are independently controllable to meter a flow of fluid therethrough.

Third directional control valve 66 is connected to fifth chamber 100 through fluid line 110 and to sixth chamber 102 through fluid line 112. Third directional control valve 66 is also connected to source of pressurized fluid 40 through fluid line 118, which connects to fluid line 40. In addition, third directional control valve 66 is connected to tank 14 and the inlet of source of pressurized fluid 12 through fluid line 114, which connects to fluid line 86. Alternatively, third directional control valve 66 may be comprised of any type of valve readily apparent to one skilled in the art, such as, for example, a spool valve.

A check valve 116 may be disposed in fluid line 114. Check valve 116 may prevent fluid released from second directional control valve 46 from flowing to third directional control valve 66. In an alternative embodiment, fluid line 114 may be connected directly to tank 14.

As further illustrated in FIG. 1, hydraulic system 10 includes an accumulator 64. A fourth directional control valve 88 is provided to control the rate and direction of fluid flow to accumulator 64. Fourth directional control valve 88 includes a first metering valve 90, a second metering valve 92, a third metering valve 94, and a fourth metering valve 96. Each of the first 90, second 92, third 94, and fourth 96 metering valves are independently controllable to meter a flow of fluid therethrough. Alternatively, fourth directional control valve 88 may be comprised of any type of valve readily apparent to one skilled in the art, such as, for example, a spool valve.

As also shown in FIG. 1, fourth directional control valve 88 is disposed between accumulator 64, fluid line 40, fluid line 86, and tank 14. A fluid line 41 connects fourth directional control valve 88 with fluid line 40. A fluid line 43 connects fourth directional control valve 88 with fluid line 86. A fluid line 45 connects fourth directional control valve 88 with tank 14.

The exemplary embodiment of hydraulic system 10 described above is operable to control the motion of work implement 13 as well as to capture energy in the form of pressurized fluid released from one or more of first, second, and third hydraulic actuators 16, 18, and 98. The pressurized fluid may be stored in accumulator 64 and used by work machine 11 to perform a future operation.

First and second directional control valves 44 and 46 control the direction and rate of fluid flow into first and second hydraulic actuators 16 and 18 and, thus, the rate and direction of movement of work implement 13. For example, to move work implement 13 in the direction indicated by arrow 29, which, for the purposes of the present disclosure, will be considered as lifting work implement 13, second 50 and fourth 54 metering valves of first directional control valve 44 and second 58 and fourth 62 metering valves of second directional control valve 46 are opened. This configuration allows pressurized fluid to flow from source of pressurized fluid 12 through fluid lines 84, 80, and 82 to reach second chamber 22 of first hydraulic actuator 14 and fourth chamber 26 of second hydraulic actuator. The force of the pressurized fluid moves pistons 30 and 36 in the direction of arrow 29. As pistons 30 and 36 move, fluid is forced out of first chamber 20 and third chamber 24. This fluid flows through fluid lines 76, 83 and 86 to return to tank 14 or to the inlet of source of pressurized fluid 12.

To move work implement 13 in the direction indicated by arrow 31, which, for the purposes of the present disclosure, will be considered as lowering of work implement 13, fluid may be released from second chamber 22 and fourth chamber 26 and fluid may be added to first chamber 20 and third chamber 24. The metering valves of first, second, and fourth directional control valves 44, 46, and 88 may be metered open in several different combinations to achieve the desired direction of fluid flow to lower work implement 13. Several of the possible valve combinations are described in greater detail below.

In one combination configured to lower work implement 13, second metering valve 50 of first directional control valve 44; second 58, third 60, and fourth 62 metering valves of second directional control valve 46; and third metering valve 94 of fourth directional control valve 88 may be partially or completely opened. The fluid connections created by this valve combination are schematically illustrated in FIG. 2*a*.

Figure 2C:
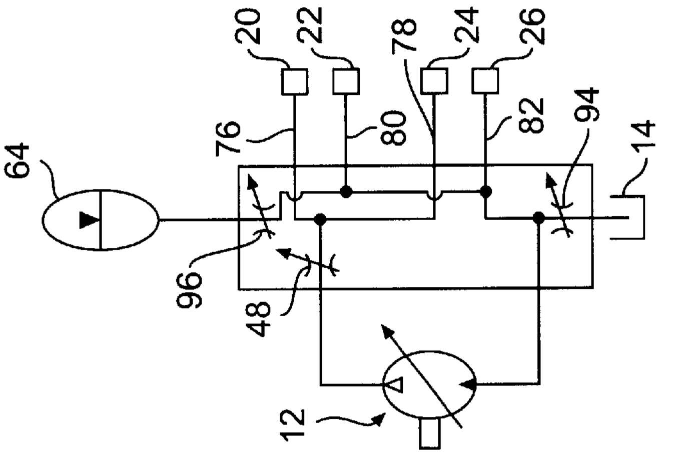
FIGS. 2*a*–2*e* are schematic and diagrammatic illustrations of exemplary hydraulic circuits that may be created with the hydraulic system of FIG. 1.
Figure 2B:
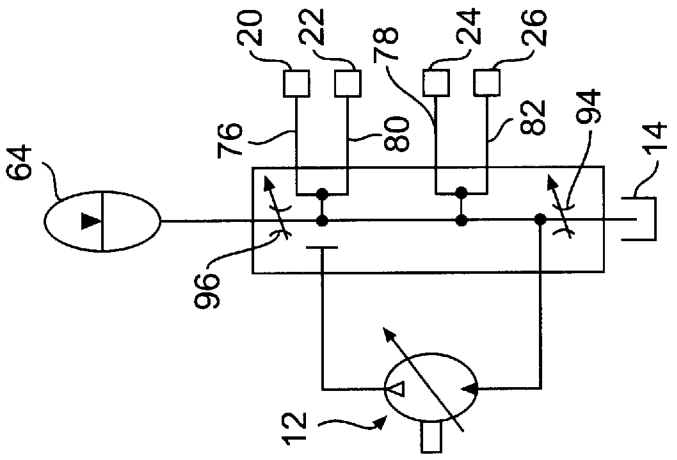
Figure 2A:
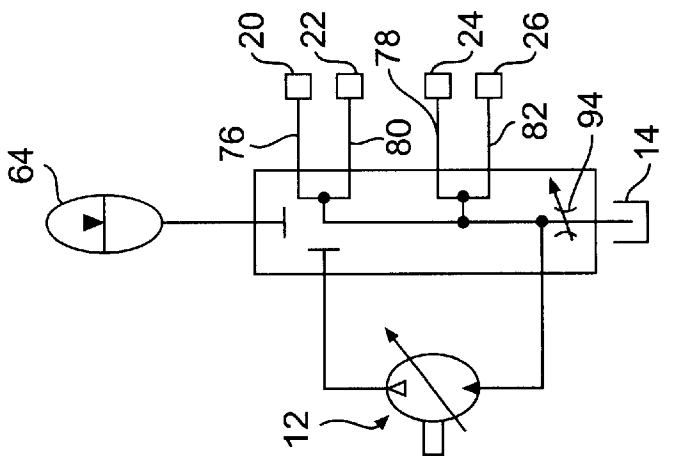

As shown in FIG. 2*a*, opening valves in this combination allows fluid to flow from second chamber 22 and fourth chamber 26 through fluid lines 80 and 82, respectively. The fluid exiting from second chamber and fourth chamber 26 may flow through metering valves 58, 60, and 62 and into fluid line 86. Third metering valve 94 of fourth directional control valve 88 may be opened to meter the fluid flowing in fluid line 86 to tank 14. Alternatively, third metering valve 94 of fourth directional control valve 88 may be closed to direct the fluid flowing in fluid line 86 to the inlet of source of pressurized fluid 12. Directing pressurized fluid to the inlet of source of pressurized fluid 12 may reduce the torque required to operate the source of pressurized fluid 12 and thereby increase the efficiency of work machine 11.

As described previously, fluid will be added to first chamber 20 and third chamber 24 as the volume of these chambers increases with movement of pistons 30 and 36. Because the weight of work implement 13 may be sufficient to force the fluid out of second and fourth chambers 22 and 26, the fluid supplied to the first chamber 20 and third chamber 24 may not need to be pressurized. Accordingly, metering valve 50 of first directional control valve 44 may be opened to meter fluid exiting second and fourth chambers 22 and 26 into first and third chambers 20 and 24. By returning some of the fluid released from second and fourth chambers 22 and 26 to first and third chambers 20 and 24, the amount of pressurized fluid required from source of pressurized fluid 12 may be reduced. In this manner, the overall efficiency of work machine 11 may be increased as less energy is required to lower work implement 13.

Another valve configuration arranged to lower work implement 13 is schematically illustrated in FIG. 2*b*. As shown therein, fluid flowing through fluid line 86 may be metered into accumulator 64 through fourth metering valve 96 of fourth directional control valve 88. Fourth metering valve 96 of fourth directional control valve 88 may be metered open depending on the pressure of the fluid in fluid line 86.

Under certain circumstances, the weight of work implement 13 acting through pistons 30 and 36 may pressurize the fluid in second and fourth chambers 22 and 26 to a level suitable for storing the fluid in accumulator 64. If this pressurized fluid were directed to tank 14, instead of accumulator 64, the energy of the pressurized fluid would be dissipated as heat. By storing the pressurized fluid in accumulator 64, at least a portion of the potential energy of an elevated work implement 13 may be captured and, as explained in greater detail below, may be used to assist work machine 11 in performing future tasks.

As shown in FIG. 1, hydraulic system 10 may include a series of pressure sensors 87. Pressure sensors 87 may be disposed, for example, in fluid lines 40 and 86, as well as adjacent accumulator 64. Pressure sensors 87 may be any device capable of sensing the pressure of a fluid in a fluid line. Fourth metering valve 96 of fourth directional control valve 88 may be metered open when the sensed pressure indicates that the pressure of the fluid in fluid line 86 is above a predetermined pressure. Alternatively, fourth metering valve 96 of fourth directional control valve 88 may be metered open when work machine 11 encounters a set of operating conditions that are known to result in the pressurization of the fluid in fluid line 86 above the predetermined limit. The pressure of the fluid entering accumulator 64 may be adjusted by opening or closing third metering valve 94 to increase or decrease the amount of fluid flowing to tank 14.

Another combination of valves configured to lower work implement 13 is illustrated in FIG. 2*c*. To achieve this combination, first metering valve 48 of first directional control valve 44; second 58, third 60 and fourth 62 metering valves of second directional control valve 46; and third metering valve 94 of fourth directional control valve 88 may be opened (referring to FIG. 1).

In this valve combination, source of pressurized fluid 12 is connected to first and third chambers 20 and 24. The force of the pressurized fluid acts on pistons 30 and 36 to move pistons 30 and 36 in the direction of arrow 31. The flow rate of fluid into first and third chambers 20 and 24 and the rate of movement of pistons 30 and 36 and work implement 13 may be controlled by adjusting first metering valve 48 of first directional control valve 44.

The movement of pistons 30 and 36 forces fluid from second and fourth chambers 22 and 26. The fluid released from second and fourth chambers 22 and 26 is directed through metering valves 58, 60 and 62 into fluid line 86. This released flow of fluid may then flow to the inlet of source of pressurized fluid 12 or may flow through metering valve 94 to tank 14. In addition, if the pressure of the fluid in fluid line 86 is above the predetermined limit, fourth metering valve 96 may be metered open to direct at least a portion of the pressurized fluid into accumulator 64.

The particular combination of valves opened to lower work implement 13 may depend upon the particular operating conditions and/or the desires of the operator. For example, the valve combination illustrated in FIG. 2*a* may be used if a rapid lowering of work implement 13 is desired. The valve combination illustrated in FIG. 2*b* may be used under normal operating conditions to improve the efficiency of work machine 11 by storing pressurized fluid in accumulator 64. The valve combination illustrated in FIG. 2*c* may be used to "power down" work implement 13, i.e. provide an additional force to lower work implement 13 when the weight of work implement 13 is not sufficient to lower work implement 13.

The pressurized fluid stored in accumulator 64 may be used to supplement or replace the pressurized fluid typically provided by source of pressurized fluid 12 to perform a function on work machine 11. With reference to FIG. 1, the pressurized fluid in accumulator 64 may be metered through fluid line 41 and into fluid line 40 by opening first metering valve 90 of fourth directional control valve 88. The pressurized fluid released from accumulator 64 may then be directed through first and second directional control valves 44 and 46 in the manner described previously to move or assist in the moving of work implement 13. By utilizing the fluid stored in accumulator 64, the amount of pressurized fluid required from source of pressurized fluid 12 is reduced. Thus, less external energy is required to move work implement 13 and the overall efficiency of work machine 11 may be increased.

Another possible use of the pressurized fluid stored in accumulator 64 is to assist in moving third hydraulic actuator 98. Referring to FIG. 1, third hydraulic actuator 98 may be moved by introducing pressurized fluid into one of fifth chamber 100 or sixth chamber 102 and allowing fluid to flow out of the other chamber. The pressurized fluid will act to move piston 104 within housing 108.

The pressurized fluid used to move third hydraulic actuator 98 may come from accumulator 64. By metering open first metering valve 90 of fourth directional control valve 88, fluid may flow from accumulator 64 to third directional control valve 66. One of first and fourth metering valves 68 and 74 may then be opened to allow the pressurized fluid from the accumulator 64 to flow to one of fifth chamber 100 or sixth chamber 102. In addition, one of second and third metering valves 70 and 72 may be metered open to allow fluid to flow from one of fifth and sixth chambers 100 and 102 to fluid line 86. It should be noted that the flow of pressurized fluid from accumulator 64 to third hydraulic actuator 98 may be supplemented or replaced by a flow of pressurized fluid generated by source of pressurized fluid 12.

In addition, pressurized fluid released by either of first or second hydraulic actuators 16 and 18 may be directed through first and second directional control valves 44 and 46 to third hydraulic actuator 98. For example, when pressurized fluid is released from second chamber 22 of first hydraulic actuator 16, fourth metering valve 54 of first directional control valve 44 may be opened. This will direct the released fluid into fluid line 118 and towards third hydraulic actuator 98.

By using the pressurized fluid stored in accumulator 64 or the pressurized fluid released from first and second hydraulic actuators 16 and 18 to move third hydraulic actuator 98, the amount of pressurized fluid required from source of pressurized may be further reduced. In this manner, the efficiency of work machine 11 may be further improved.

As mentioned above, when piston 104 of third hydraulic actuator 98 is moving, fluid will be released from either fifth chamber 100 or sixth chamber 102, depending upon the direction of movement of piston 104. In certain operating conditions, the fluid released from either fifth chamber 100 or sixth chamber 102 may be pressurized above the predetermined level. In these situations, fourth metering valve 96 of third directional control valve 88 may be opened to direct the pressurized fluid into accumulator 64. In this manner, additional energy in the form of pressurized fluid released from third hydraulic actuator 98 may be captured in accumulator 64.

Another potential use of the pressurized fluid stored in accumulator 64 is to assist the propulsion of work machine 11. As schematically illustrated in FIG. 2*d*, pressurized fluid released from accumulator 64 may be directed to the inlet of source of pressurized fluid 12. This may be accomplished by opening fourth metering valve 96 of fourth directional control valve 88 to allow fluid to flow into fluid line 86. A check valve 117 may be disposed in fluid line 86 between fourth directional control valve 88 and second directional control valve 46 to prevent fluid from flowing from accumulator 64 to second directional control valve 46. Fluid exiting source of pressurized fluid 12 will therefore be directed to tank 14 through second metering valve 92 of fourth directional control valve 88.

As shown in FIG. 1, source of pressurized fluid 12 is connected to an engine 63 through a crankshaft 65. Typically, source of pressurized fluid 12 includes a drive gear (not shown) that engages a corresponding gear (not shown) secured to crankshaft 65. The operation of engine 63 exerts a torque on crankshaft 65 that drives source of pressurized fluid 12. In operation, source of pressurized fluid 12 draws in fluid at an ambient or low-charge pressure and works the fluid to increase the pressure of the fluid.

If, however, pressurized fluid is introduced to the inlet of source of pressurized fluid 12, the energy in the pressurized fluid may assist the torque generated by engine 63. For example, introducing pressurized fluid to the inlet of a fixed capacity pump may effectively reverse the operation of the pump and cause the pump to operate as a fluid motor. The pump will therefore exert a torque on crankshaft 65 that assists the operation of engine 63. Thus, when work machine 11 is accelerating, pressurized fluid may be directed to the inlet of source of pressurized fluid 12 to assist engine 63 in propelling the work vehicle. In this manner, the amount of fuel required to accelerate work machine 11 to a given speed may be reduced.

Thus, by directing pressurized fluid from accumulator 64 to the inlet of source of pressurized fluid 12, the operation of engine 63 may be assisted. This additional energy may be used, for example, to assist engine 63 when accelerating work machine 11. This additional energy may also be used, for example, to maintain the speed of work machine 11.

In addition, accumulator 64 may be used to capture the kinetic energy of work machine 11 when the operator instructs that the ground speed of work machine be reduced.

The ground speed of work machine 11 may be reduced by decreasing the amount of energy applied to propelling the vehicle and/or by exerting a force that opposes the motion of work machine 11. The amount of energy applied to propel work machine 11 may be decreased, for example, by decreasing the amount of fuel combusted by the engine. A force opposing the movement of work machine may be exerted, for example, by applying a brake.

Figure 2E:
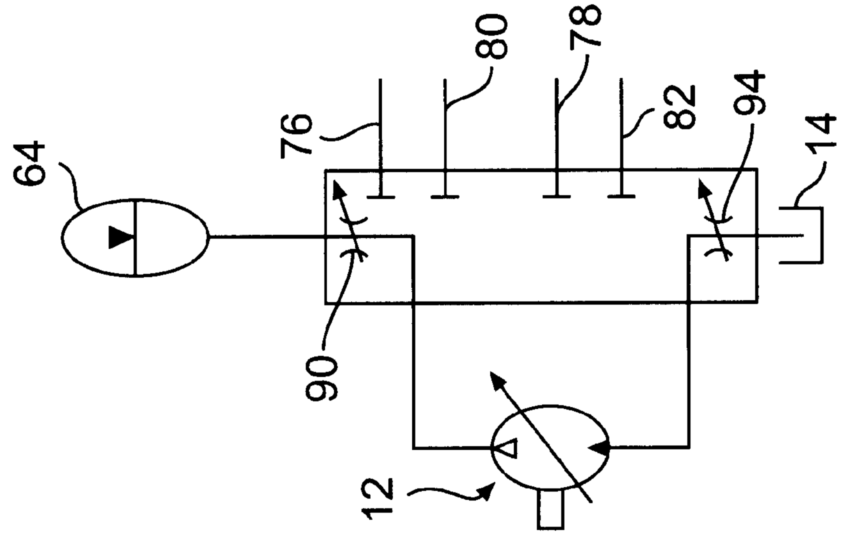
Figure 2D:
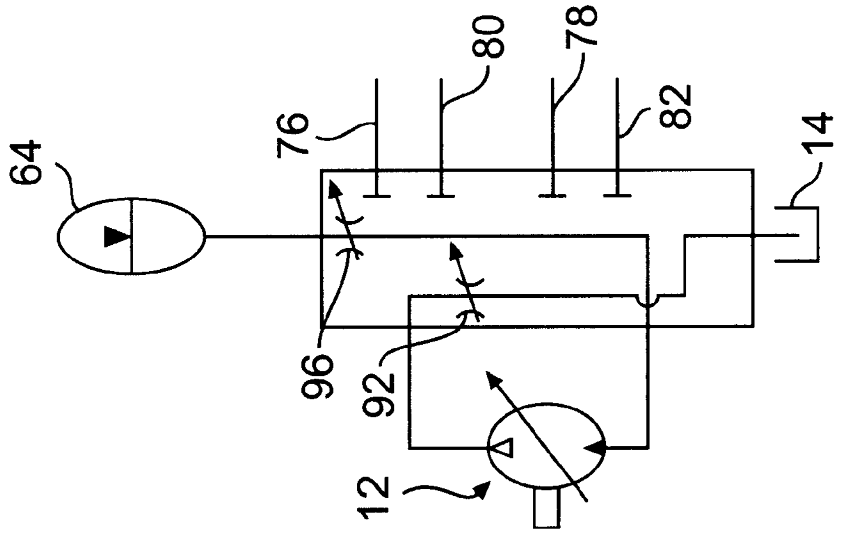

In addition, as schematically illustrated in FIG. 2*e*, a force opposing the movement of work machine 11 may be exerted by engaging source of pressurized fluid 12 and directing the generated pressurized fluid to accumulator 64. The torque required by source of pressurized fluid 12 to pressurize the fluid will oppose the rotation of engine crankshaft 65 and, therefore, will oppose the operation of the transmission of work machine 11.

Thus, when an operator requests that the ground speed of work vehicle 11 be reduced, first metering valve 90 of fourth directional control valve 88 may be opened to connect source of pressurized fluid with accumulator 64. In this manner, at least a portion of the kinetic energy of the moving work machine 11 may be converted to energy in the form of pressurized fluid in accumulator 64. It should be noted that the brakes of work machine 11 may be applied in combination with, or instead of, pressurizing additional fluid to reduce the ground speed of work machine 11.

Accumulator 64 may also be used to capture energy when work machine 11 encounters a "bucket pinning" situation. A bucket pinning situation may be encountered when work machine 11 engages an obstacle, such as, for example, a work pile that exerts a significant force on the work machine and holds the work machine in a stationary position. In this situation, the torque exerted by engine 63 through the transmission may cause the traction devices, which may be wheels or tracks, of the work machine to slip or spin on the ground while the work machine remains stationary. In other words, the energy used by work machine 11 attempting to move the work machine is wasted as the work machine is held stationary by the obstacle.

This energy may be captured as pressurized fluid or used to provide a boost to the hydraulic actuators moving the work implement. For example, with reference to the exemplary embodiment of FIG. 1, when the torque generated by engine 63 is great enough to cause the traction devices of work machine 11 to slip, source of pressurized fluid 12 may be engaged to reduce the torque exerted on the traction devices. As discussed above, engaging source of pressurized fluid 12 to generate additional pressurized fluid will require additional torque from engine 63 and will thereby reduce the torque exerted on the traction devices. Thus, the excess torque that causes the traction devices to slip or spin may be used to generate additional pressurized fluid. This additional pressurized fluid may be directed into accumulator 64 or may be directed to one or more of first, second, and third hydraulic actuators 16, 18, 98 to assist in the movement of work implement 13.

Figure 3:
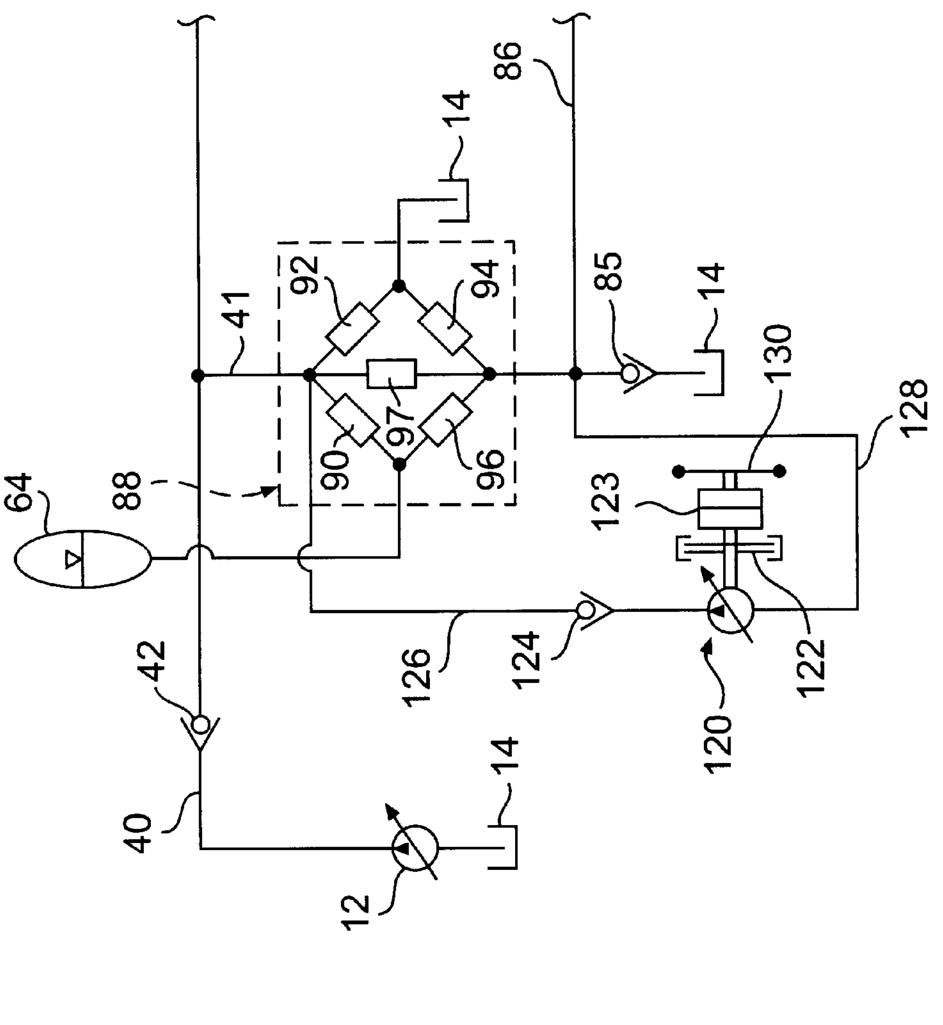
FIG. 3 is a schematic and diagrammatic illustration of another exemplary embodiment of a hydraulic system according to the present invention.

One skilled in the art will also recognize that in certain work machines, source of pressurized fluid 12 is often separated from the traction devices through a device, such as a torque converter. In this configuration, the spinning of the traction device may not result in an excess torque on crankshaft 65 of engine 63. As illustrated in FIG. 3, to capture this excess energy, a second source of pressurized fluid 120 may be connected to traction device 130. Second source of pressurized fluid 120 may be directly connected to traction device 130 or a clutch 122 may be disposed between second source of pressurized fluid 120 and traction device 130. A gear reduction 123 that may have clutch and brake mechanisms may be operatively engaged with traction device 130.

As also shown in FIG. 3, a fluid line 128 connects second source of pressurized fluid 120 with fluid line 86. Second source of pressurized fluid 120 may draw fluid from tank 14 or receive fluid released from one or more of the first, second, or third hydraulic actuators 16, 18, or 98. In addition, as described previously, accumulator 64 may release pressurized fluid to the inlet of second source of pressurized fluid 120 to thereby drive the second source of pressurized fluid as a fluid motor.

Second source of pressurized fluid 120 may direct pressurized fluid into fluid line 126. A check valve 124 may be disposed in fluid line 126 to prevent fluid from returning to second source of pressurized fluid 120. Fluid line 126 may be connected to fluid line 41. Thus, pressurized fluid provided by second source of pressurized fluid 120 may be directed by fourth directional control valve 88 into accumulator 64 or may flow through fluid line 40 to be used in moving first, second, or third hydraulic actuators 16, 18, 98.

When work machine 11 is operating under normal circumstances, however, engagement of second source of pressurized fluid 120 with traction device 130 may cause a resistance to movement of traction device 130. To prevent this resistance, clutch 122 may be disengaged to disconnect second source of pressurized fluid 120 from traction device 130. Alternatively, a fifth metering valve may be disposed in fourth directional control valve 88. Fifth metering valve 97 may be opened to allow second source of pressurized fluid to circulate fluid flow and thereby reduce the resistance exerted against traction device 130.

Figure 4:
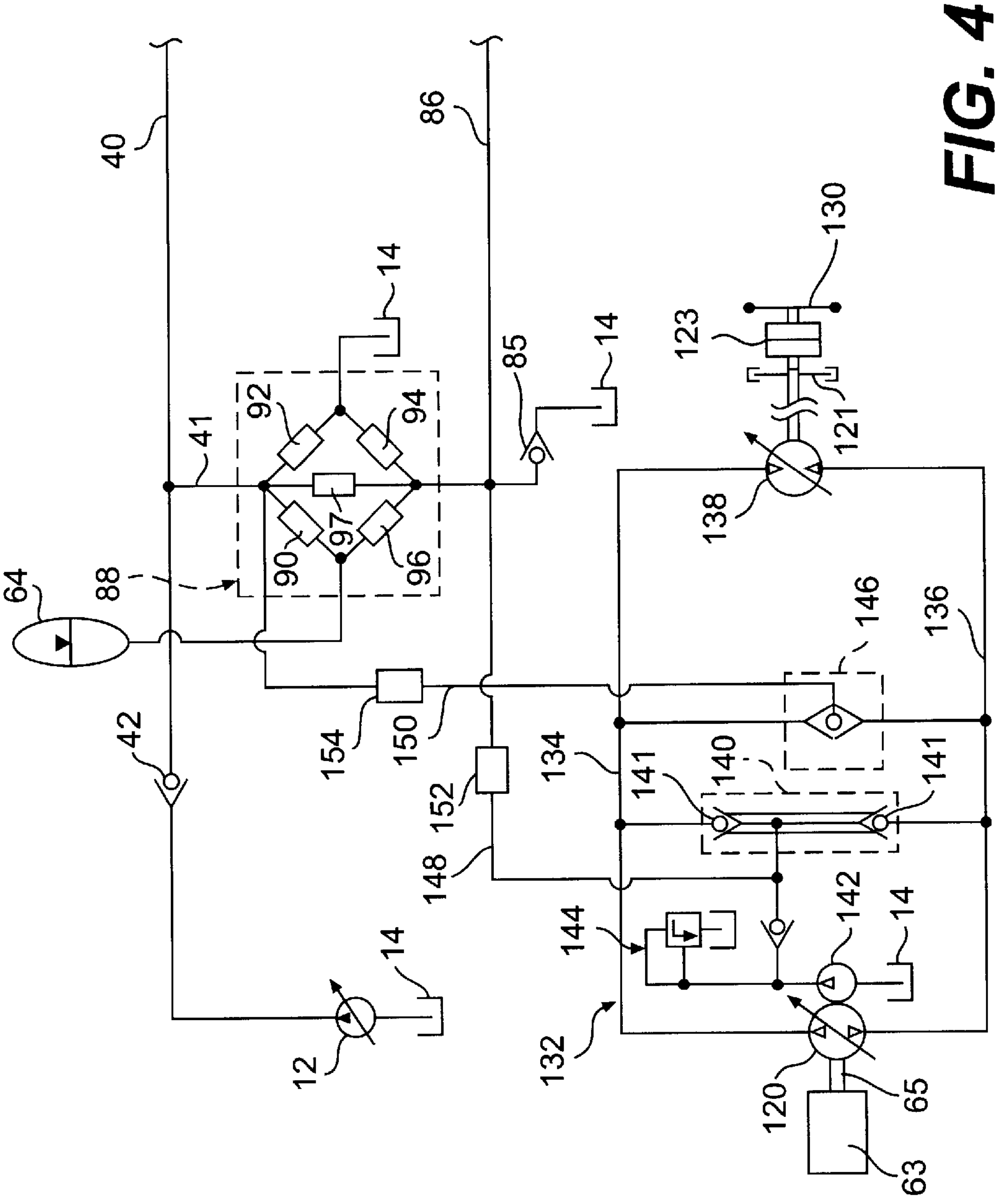
FIG. 4 is a schematic and diagrammatic illustration of another exemplary embodiment of a hydraulic system according to the present invention.

Excess energy created by a work machine having a hydrostatic drive system in a bucket-pinning situation may also be captured with the above-described hydraulic system. As illustrated in FIG. 4, a work machine may include a hydrostatic drive 132. Hydrostatic drive 132 includes a fluid motor 138 that is connected to second source of pressurized fluid 120 by fluid lines 134 and 136. Fluid motor 138 is connected to traction device 130 through gear reduction 123, which may include a brake 121.

As will be recognized by one skilled in the art, second source of pressurized fluid 120 is operable to generate a flow of pressurized fluid through one of fluid lines 134 and 136. The generated flow of pressurized fluid acts on fluid motor 138 to generate an output torque that may be transmitted to traction device 130 to move work machine 11. Brake 121 is operable to assist active braking and park braking of work machine 11.

As also shown in FIG. 4, a resolver valve 146 may be disposed between fluid lines 134 and 136. Resolver valve 146 may be connected to fourth directional control valve 88 and fluid line 41 through a fluid line 150. A valve 154 may be disposed in fluid line 150 to control the rate of fluid flow therethrough. Valve 154 may be an independent metering valve or any other device readily apparent to one skilled in the art as capable of selectively regulating a flow of fluid.

Resolver valve 146 is configured to connect fluid line 150 with the one of fluid lines 134 and 136 that contains the higher pressure fluid. If, for example, second source of pressurized fluid 120 is driving fluid motor with a flow of pressurized fluid in fluid line 134, the returning fluid flow in fluid line 136 will be at a lower pressure. Accordingly, resolver valve 146 will open to connect fluid line 134 with fluid line 150. As shown, resolver valve 146 may contain a check ball with opposing seats. Resolver valve 146 may also be any other device readily apparent to one skilled in the art.

In a bucket-pinning situation, where the work machine is stationary and fluid motor 138 exerts an excessive torque on traction device 130, valve 154 may be opened to reduce the torque on traction device 130. If, for example, fluid line 134 contains the pressurized fluid flow, valve 154 may be opened to direct some of the pressurized fluid into fluid line 150 instead of into fluid motor 138. Fourth directional control valve 88 may direct the flow of pressurized fluid from fluid line 150 into accumulator 64 or into the first and second directional control valves through fluid line 40. Thus, the energy that would have been otherwise wasted as excessive torque, may be saved for future use in accumulator 64 or used to provide a boost to the work implement.

As one skilled in the art will recognize, any fluid that is removed from hydrostatic drive 132 through fluid line 150 will need to be replaced. As shown, in the exemplary embodiment of FIG. 4, make-up fluid may be provided to hydrostatic drive 132 through a charge shuttle 140. It is recognized that makeup fluid may be provided to hydrostatic drive through any other suitable device.

Charge shuttle 140 is disposed between fluid lines 134 and 136 and is configured to provide a fluid connection with the low pressure side of hydrostatic drive 132. Charge shuttle 140 may include a pair of connected check valves 141 that are configured to engage opposing seats. The pressure of the fluid in fluid lines 134 and 136 controls the movement of connected check valves 141 to establish a fluid connection with the fluid line containing the lower pressure fluid. For example, if second source of pressurized fluid 120 is driving fluid motor 138 with pressurized fluid in fluid line 134 and is receiving low pressure fluid from fluid line 136, the pressure difference between fluid lines 134 and 136 will move connected check valves 141 such that a fluid connection is established with fluid line 136, which represents the low pressure side of hydrostatic drive.

Make-up fluid may be provided to charge shuttle 140 in any manner readily apparent to one skilled in the art. For example, an auxiliary pump 142 may be connected to charge shuttle 140 and configured to draw fluid from tank 14 and provide a flow of make-up fluid to charge shuttle 140. A pressure relief valve 144 may be disposed between auxiliary pump 142 and charge shuttle 140. Pressure relief valve 144 is configured to open and allow pressurized fluid to flow to tank 14 if the pressure of the fluid between auxiliary pump 142 and charge shuttle 140 exceeds a pre-determined pressure limit.

Make-up fluid may also be provided to hydrostatic drive 132 from fluid line 86. As shown in FIG. 4, charge shuttle 140 may be connected to fluid line 86 through a fluid line 148 and a valve 152. Valve 152 may be configured to selectively control the rate at which fluid flows through fluid line 148. Valve 152 may be an independent metering valve or any other device readily apparent to one skilled in the art as capable of selectively regulating a flow of fluid. When valve 152 is opened, fluid may flow from fluid line 86 to charge shuttle 140 and into hydrostatic drive 132. Thus, the fluid in fluid line 86, which may be fluid returning from one of the first, second, or third hydraulic actuators, may be used to replace fluid extracted from hydrostatic drive 132, instead of generating additional pressurized fluid with auxiliary pump 142. This pressurized fluid may also be used to pressurize the inlet of source of pressurized fluid 120 and assist engine 63 in providing torque to propel work machine 11 and/or move work implement 13.

Industrial Applicability

As will be apparent from the foregoing description, the present invention provides a hydraulic regeneration system for a work machine. The hydraulic regeneration system captures energy that would otherwise be wasted in the normal operation of the work machine and stores this energy in the form of pressurized fluid in an accumulator. The pressurized fluid stored in the accumulator may be used to perform a future operation of the work machine, such as for example, assisting in the movement of a work implement or assisting in the movement of the work machine.

Thus, with the present invention, the energy requirements of the engine may be reduced and a smaller engine may be used. In addition, the present invention may lower the amount of heat generated during normal operation. The reduction in generated heat may extend the operating life of component parts, thereby reducing the amount of required service.

By capturing and reusing energy, the present invention may increase the productivity of the work machine while decreasing the fuel demands of the work machine. Thus, the present invention may improve the overall efficiency of the work machine. In addition, the reduced fuel consumption may result in a reduced level of noise and emissions produced by the work machine.

It will be apparent to those skilled in the art that various modifications and variations can be made in the hydraulic regeneration system of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A hydraulic system, comprising:

a first hydraulic actuator having a first chamber and a second chamber;

a second hydraulic actuator having a third chamber and a fourth chamber, the second hydraulic actuator being capable of operating independently from the first hydraulic actuator;

a source of pressurized fluid;

a first directional control valve disposed between (i) the source of pressurized fluid and (ii) the first chamber of the first hydraulic actuator and the third chamber of the second hydraulic actuator; and a second directional control valve disposed between (i) the source of pressurized fluid and (ii) the second chamber of the first hydraulic actuator and the fourth chamber of the second hydraulic actuator.

2. The hydraulic system of claim 1, wherein each of the first and second directional control valves includes a set of four independent metering valves.

3. The hydraulic system of claim 1, further including:

a third hydraulic actuator having a fifth chamber and a sixth chamber; and a third directional control valve connected to at least one of the first and second directional control valves and operable to direct pressurized fluid released from at least one of the first, second, third, and fourth chambers into at least one of the fifth and sixth chambers.

4. The hydraulic system of claim 3, wherein each of the first, second, and third hydraulic actuators is a hydraulic cylinder.

5. The hydraulic system of claim 1, further including:

an accumulator in fluid communication with the first hydraulic actuator and the second hydraulic actuator; and a fourth directional control valve operable to selectively direct a flow of pressurized fluid from at least one of the first, second, third, and fourth chambers into the accumulator.

6. The hydraulic system of claim 5, wherein the accumulator is connected to the first and second directional control valves to provide pressurized fluid to at least one of the first, second, third, and fourth chambers.

7. The hydraulic system of claim 5, wherein the fourth directional control valve is configured to direct pressurized fluid from the accumulator to the source of pressurized fluid.

8. The hydraulic system of claim 5, wherein the fourth directional control valve is configured to direct pressurized fluid from the source of pressurized fluid to the accumulator.

9. A method of moving a work implement actuated by a first hydraulic actuator having a first chamber and a second chamber and a second hydraulic actuator having a third chamber and a fourth chamber, comprising:

directing a flow of fluid through a first directional control valve to the first chamber of the first hydraulic actuator and the third chamber of the second hydraulic actuator to move the work implement in a first direction;

directing a flow of fluid through a second directional control valve to the second chamber of the first hydraulic actuator and the fourth chamber of the second hydraulic actuator to move the work implement in a second direction; and directing fluid released from at least one of the first, second, third, and fourth chambers through a third directional control valve into at least one of a fifth and a sixth chamber of a third hydraulic actuator.

10. The method of claim 9, further including directing the fluid released from at least one of the first, second, third, and fourth chambers through a fourth directional control valve into an accumulator.

11. The method of claim 10, further including directing pressurized fluid stored in the accumulator through one of the first and second directional control valves to at least one of the first, second, third, and fourth chambers.

12. The method of claim 10, further including directing pressurized fluid stored in the accumulator to a source of pressurized fluid.

13. The method of claim 10, further including directing a flow of pressurized fluid from a source of pressurized fluid through the fourth directional control valve to the accumulator.

14. A hydraulic system, comprising:

an accumulator;

a source of pressurized fluid;

a first directional control valve;

a second directional control valve;

a first fluid line connecting the source of pressurized fluid with the first directional control valve;

a second fluid line connecting the source of pressurized fluid with the second directional control valve; and a third directional control valve configured to control the rate and direction of fluid flow between the accumulator and the first and second fluid lines.

15. The hydraulic system of claim 14, wherein each of the first, second, and third directional control valves include a set of four independent metering valves.

16. The hydraulic system of claim 15, further including a second source of pressurized fluid in fluid connection with the first and second fluid lines.

17. The hydraulic system of claim 16, wherein the third directional control valve includes a fifth independent metering valve.

18. The hydraulic system of claim 14, further including:

a first hydraulic actuator having a first chamber and a second chamber;

a second hydraulic actuator having a third chamber and a fourth chamber; and a third hydraulic actuator having a fifth chamber and a sixth chamber, wherein the first directional control valve is disposed between the source of pressurized fluid and the first chamber of the first hydraulic actuator and the third chamber of the second hydraulic actuator, the second directional control valve is disposed between the source of pressurized fluid and the second chamber of the first hydraulic actuator and the fourth chamber of the second hydraulic actuator, and the third directional control valve is disposed between the source of pressurized fluid and the fifth and sixth chambers of the third hydraulic actuator.

19. A method of using pressurized fluid stored in a hydraulic circuit having a source of pressurized fluid and an accumulator, comprising:

connecting the source of pressurized fluid to a first directional control valve with a first fluid line;

connecting the source of pressurized fluid to a second directional control valve with a second fluid line; and directing a flow of pressurized fluid from the accumulator through a third directional control valve to one of the first and second fluid lines.

20. The method of claim 19, further including:

operating the first directional control valve to control a flow of pressurized fluid to a first chamber of a first hydraulic actuator and a third chamber of a second hydraulic actuator; and operating the second directional control valve to control a flow of pressurized fluid to a second chamber of the first hydraulic actuator and a fourth chamber of the second hydraulic actuator.

21. A work machine, comprising:

a work implement;

a first hydraulic actuator having a first chamber and a second chamber and operatively connected to the work implement;

a second hydraulic actuator having a third chamber and a fourth chamber and operatively connected to the work implement, the second hydraulic actuator being capable of operating independently from the first hydraulic actuator;

a source of pressurized fluid;

a first directional control valve disposed between (i) the source of pressurized fluid and (ii) the first chamber of the first hydraulic actuator and the third chamber of the second hydraulic actuator; and a second directional control valve disposed between (i) the source of pressurized fluid and (ii) the second chamber of the first hydraulic actuator and the fourth chamber of the second hydraulic actuator.

22. The work machine of claim 21, wherein each of the first and second directional control valves includes a set of four independent metering valves.

23. The work machine of claim 21, further including:

a third hydraulic actuator having a fifth chamber and a sixth chamber; and a third directional control valve connected to at least one of the first and second directional control valves and operable to direct pressurized fluid released from at least one of the first, second, third, and fourth chambers into at least one of the fifth and sixth chambers.

24. The work machine of claim 23, wherein each of the first, second, and third hydraulic actuators is a hydraulic cylinder.

25. The work machine of claim 21, further including:

an accumulator in fluid communication with the first hydraulic actuator and the second hydraulic actuator; and a fourth directional control valve operable to selectively direct a flow of pressurized fluid from at least one of the first, second, third, and fourth chambers into the accumulator.

26. The work machine of claim 25, wherein the accumulator is connected to the first and second directional control valves to provide pressurized fluid to at least one of the first, second, third, and fourth chambers.

27. The work machine of claim 25, wherein the fourth directional control valve is configured to direct pressurized fluid from the accumulator to the source of pressurized fluid.

28. The work machine of claim 25, wherein the fourth directional control valve is configured to direct pressurized fluid from the source of pressurized fluid to the accumulator.

29. A work machine, comprising:

a work implement;

an accumulator;

a source of pressurized fluid;

a first directional control valve disposed between the source of pressurized fluid and the work implement;

a second directional control valve disposed between the source of pressurized fluid and the work implement;

a first fluid line connecting the source of pressurized fluid with the first directional control valve;

a second fluid line connecting the source of pressurized fluid with the second directional control valve; and a third directional control valve configured to control the rate and direction of fluid flow between the accumulator and the first and second fluid lines.

30. The work machine of claim 29, further including a traction device and a second source of pressurized fluid operatively engaged with the traction device and in fluid connection with the third directional control valve.

31. The work machine of claim 30, further including a clutch operable to selectively engage the second source of pressurized fluid with the traction device.

32. The work machine of claim 29, wherein each of the first, second, and third directional control valves include a set of four independent metering valves.

33. The work machine of claim 32, wherein the third directional control valve includes a fifth independent metering valve.

34. The work machine of claim 29 further including a hydrostatic drive having a second source of pressurized fluid, a fluid motor, and a valve configured to provide pressurized fluid from the hydrostatic drive to the third directional control valve.

35. The work machine of claim 34, wherein a metering valve is disposed between said valve and the third directional control valve.

36. The work machine of claim 34, further including a charge shuttle configured to provide a fluid communication with a low pressure side of the hydrostatic drive.

37. The work machine of claim 36, further including an auxiliary pump configured to provide a flow of pressurized fluid to the charge shuttle.

38. The work machine of claim 36, wherein the charge shuttle is connected to the second fluid line.

39. The work machine of claim 38, wherein a metering valve is disposed between the charge shuttle and the second fluid line.

* * * * *